(12) United States Patent
Yukawa

(10) Patent No.: US 10,141,563 B2
(45) Date of Patent: Nov. 27, 2018

(54) NEGATIVE-ELECTRODE ACTIVE MATERIAL, PRODUCTION PROCESS FOR THE SAME AND ELECTRIC STORAGE APPARATUS

(71) Applicant: KABUSHIKI KAISHA TOYOTA JIDOSHOKKI, Kariya-shi, Aichi (JP)

(72) Inventor: Kayoko Yukawa, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 516 days.

(21) Appl. No.: 14/768,325

(22) PCT Filed: Jan. 31, 2014

(86) PCT No.: PCT/JP2014/000516
§ 371 (c)(1),
(2) Date: Aug. 17, 2015

(87) PCT Pub. No.: WO2014/147935
PCT Pub. Date: Sep. 25, 2014

(65) Prior Publication Data
US 2016/0006022 A1    Jan. 7, 2016

(30) Foreign Application Priority Data
Mar. 18, 2013    (JP) ................... 2013-055200

(51) Int. Cl.
*H01M 4/136*    (2010.01)
*H01M 4/134*    (2010.01)
(Continued)

(52) U.S. Cl.
CPC ........... *H01M 4/136* (2013.01); *H01M 4/134* (2013.01); *H01M 4/1395* (2013.01);
(Continued)

(58) Field of Classification Search
CPC ...................................... H01M 4/136
See application file for complete search history.

(56) References Cited

U.S. PATENT DOCUMENTS 4,459,163 A * 7/1984 MacDiarmid ......... H01L 29/267
423/349
2003/0186123 A1* 10/2003 Maddanimath ......... H01M 4/02
429/213

FOREIGN PATENT DOCUMENTS

JP    3865033 B2    1/2007
JP    2008235785 A * 10/2008
(Continued)

OTHER PUBLICATIONS

Translation of JP2012059509 (Year: 2012).*
(Continued)

*Primary Examiner* — Sarah A. Slifka
*Assistant Examiner* — Brian R Ohara
(74) *Attorney, Agent, or Firm* — Sughrue Mion, PLLC

(57) ABSTRACT

A negative-electrode active material is used, the negative-electrode active material including: a nanometer-size silicon material produced by heat treating a lamellar polysilane having a structure in which multiple six-membered rings constituted of a silicon atom are disposed one after another, and expressed by a compositional formula, $(SiH)_n$; and the nanometer-size silicon material including silicon, and a halogen element wherein the halogen element is included in a molar fraction of 11.5 or less to a molar amount of the silicon taken as 100. Since the content of halogen has been reduced, an electric storage apparatus using the negative-electrode active material for one of the negative electrodes has an upgraded capacity maintained rate.

5 Claims, 1 Drawing Sheet

(51) Int. Cl.
*H01M 4/1395* (2010.01)
*H01M 4/38* (2006.01)
*H01M 4/58* (2010.01)
*H01M 10/0525* (2010.01)
*H01M 4/02* (2006.01)

(52) U.S. Cl.
CPC .......... *H01M 4/386* (2013.01); *H01M 4/582* (2013.01); *H01M 10/0525* (2013.01); *H01M 2004/027* (2013.01)

(56) References Cited

FOREIGN PATENT DOCUMENTS

| | | | | | |
|---|---|---|---|---|---|
| JP | 2009-102219 | A | | 5/2009 | |
| JP | 2009-224145 | A | | 10/2009 | |
| JP | 2011-90806 | A | | 5/2011 | |
| JP | 2011090806 | A | * | 5/2011 | |
| JP | 2012-59509 | A | | 3/2012 | |
| JP | 2012059509 | A | * | 3/2012 | |
| JP | 2012059509 | A | * | 3/2012 | ............. H01M 4/36 |
| JP | 2012-212561 | A | | 11/2012 | |
| JP | 2013-37809 | A | | 2/2013 | |
| JP | 2013-234088 | A | | 11/2013 | |

OTHER PUBLICATIONS

Translation of JP2008235785 (Year: 2018).*
Translation JP2011090806 (Year: 2018).*
Translation JP2012059209 (Year: 2018).*
H.D. Fuchs, et al., "Porous silicon and siloxene: Vibrational and structural properties", Physical Review B, Sep. 15, 1993, pp. 8172-8190, vol. 48, No. 11.
International Search Report of PCT/JP2014/000516, dated Apr. 15, 2014. [PCT/ISA/210].
Written Opinion of PCT/JP2014/000516, dated Apr. 15, 2014. [PCT/ISA/237].

* cited by examiner

NEGATIVE-ELECTRODE ACTIVE MATERIAL, PRODUCTION PROCESS FOR THE SAME AND ELECTRIC STORAGE APPARATUS

CROSS REFERENCE TO RELATED APPLICATIONS

This application is a National Stage of International Application No. PCT/JP2014/000516 filed Jan. 31, 2014, claiming priority based on Japanese Patent Application No. 2013-055200, filed Mar. 18, 2013, the contents of all of which are incorporated herein by reference in their entirety.

TECHNICAL FIELD

The present invention relates to a negative-electrode active material used for electric storage apparatuses such as lithium-ion secondary batteries, a production process for the same, and to an electric storage apparatus such as secondary batteries, electric double-layer capacitors and lithium-ion capacitors using the negative-electrode active material, respectively.

BACKGROUND ART

Lithium-ion secondary batteries have high charged and discharged capacities, and are batteries being able to make the outputs high. Currently, the lithium-ion secondary batteries have been used mainly as power sources for portable electronic appliances, and have further been expected as power sources for electric automobiles anticipated to become widespread from now on. The lithium-ion secondary batteries comprise active materials being capable of inserting and eliminating (or sorbing and desorbing) lithium (Li) in the positive electrode and negative electrode, respectively. And, lithium ions moving within an electrolytic solution disposed between the two electrodes lead to operating the lithium-ion secondary batteries.

In the lithium-ion secondary batteries, a lithium-containing metallic composite oxide, such as lithium/cobalt composite oxides, has been used mainly as an active material of the positive electrode; whereas a carbon material having a multilayered structure has been used mainly as an active material of the negative electrode. The performance of the lithium-ion secondary batteries is dependent on materials of the positive electrode, negative electrode and electrolyte constituting the secondary batteries. Even among the materials, researches and developments of active-material ingredients forming the active materials have been carried out actively. For example, silicon or silicon oxides having a higher capacity than the capacity of carbon have been investigated as a negative-electrode active-material ingredient.

Using silicon as a negative-electrode active material enables a battery to have a higher capacity than using a carbon material. However, silicon exhibits a large volumetric changes accompanied by occluding and releasing (or sorbing and desorbing) lithium (Li) at the time of charging and discharging operations. Consequently, silicon has been pulverized finely to cause structural changes so that silicon has peeled off or come off from a current collector, and thereby such a problematic issue arises probably that the charging/discharging cycle longevity of a battery is short. Hence, using a silicon oxide as a negative-electrode active material enables the volumetric changes accompanied by sorbing and desorbing lithium (Li) at the time of charging and discharging operations to be inhibited more than using silicon.

For example, employing as a negative-electrode active material silicon oxide (e.g., $SiO_x$ where "x" is $0.5 \leq$"x"$\leq 1.5$ approximately) has been investigated. The $SiO_x$ has been known to decompose into Si and $SiO_2$ when being heat treated. The decomposition is referred to as a "disproportionation reaction," the $SiO_x$ separates into two phases, an Si phase and an $SiO_2$ phase, by the internal reactions of solid. The Si phase separated to be obtainable is very fine. Moreover, the $SiO_2$ phase covering the Si phase possesses an action of inhibiting electrolytic solutions from being decomposed. Therefore, a secondary battery, which uses a negative-electrode active material composed of the $SiO_x$ having been decomposed into Si and $SiO_2$, excels in the cyclability.

The finer silicon particles constituting the Si phase of the above-mentioned $SiO_x$ are, the more a secondary battery using the particles as a negative-electrode active material is upgraded in the cyclability. Hence, Japanese Patent No. 3865033 (i.e., Patent Application Publication No. 1) sets forth a process for producing $SiO_x$ by heating metallic silicon and $SiO_2$ to sublime in order to turn the metallic silicon and $SiO_2$ into a silicon oxide gas, and then cooling the silicon oxide gas. The process enables the particle diameters of the silicon particles constituting the Si phase to exhibit such a nanometer size as from 1 nm to 5 nm.

Moreover, Japanese Unexamined Patent Publication (KOKAI) Gazette No. 2009-102219 (i.e., Patent Application Publication No. 2) sets forth a production process in which a silicon raw material is decomposed down to the elemental states in a high-temperature plasma, the decomposed silicon raw material is cooled quickly down to a liquid nitrogen temperature to obtain nanometer-size silicon particles, and the nanometer-size silicon particles are fixated into an $SiO_2$—$TiO_2$ matrix by a sol-gel method, and the like.

However, according to the production process set forth in Patent Application Publication No. 1, the matrix is limited to subliming materials. Moreover, according to the production process set forth in Patent Application Publication No. 2, a high energy has come to be needed for plasma discharge. In addition, the silicon composites obtained by the production processes have such a drawback that the dispersibility of Si-phase silicon particles is so low that the particles are likely to agglomerate. When the Si particles agglomerate one another so that the particle diameters become large, a secondary battery using the agglomerated Si particles as a negative-electrode active material has a low initial capacity, and the cyclability also declines.

Incidentally, nanometer-size silicon materials, which have been expected to be utilized in fields such as semiconductors, electric and electronic engineering, have been developed in recent years. For example, Physical Review B(1993), vol. 48, pp. 8,172-8,189 (i.e., Non-patent Literature No. 1) sets forth a process in which a lamellar polysilane is synthesized by reacting hydrogen chloride (HCl) and calcium disilicide ($CaSi_2$) one another. The article further sets forth that the thus obtained lamellar polysilane is utilizable for light-emitting devices, and the like.

And, Japanese Unexamined Patent Publication (KOKAI) Gazette No. 2011-090806 (i.e., Patent Application Publication No. 3) sets forth a lithium-ion secondary battery using a lamellar polysilane as a negative-electrode active material.

PATENT LITERATURE

Patent Application Publication No. 1: Japanese Patent Gazette No. 3865033;

Patent Application Publication No. 2: Japanese Unexamined Patent Publication (KOKAI) Gazette No. 2009-102219; and Patent Application Publication No. 3: Japanese Unexamined Patent Publication (KOKAI) Gazette No. 2011-090806

NON-PATENT LITERATURE

Non-patent Literature No. 1: Physical Review B(1993), vol. 48, pp. 8,172-8,189

SUMMARY OF THE INVENTION

Technical Problem

However, since the negative-electrode active material composed of the lamellar polysilane set forth in Patent Application Publication No. 3 had a large BET specific surface area, the negative-electrode active material is not preferable as a negative-electrode active-material ingredient for secondary battery. For example, in the negative electrode of a lithium-ion secondary battery, since a large BET specific surface area facilitates decompositions of the electrolytic solution, the irreversible capacity consumed at the negative electrode becomes so great that making the capacity high is difficult.

Hence, calcining the lamellar polysilane set forth in Patent Application Publication No. 3 under a nonoxidizing atmosphere came to be thought of. Since the calcination method makes nanometer-size silicon of which the crystallite size is a few nanometers obtainable, the nanometer-size silicon is suitable as a negative-electrode active material.

However, a lithium-ion secondary battery using as a negative-electrode active material the nanometer-size silicon produced by the aforementioned method had such drawbacks that the declining degree in the charged capacities was large at the time of a cycle test and the capacity maintained rate was low thereat.

The present invention is made in view of such circumstances. An object of the present invention is to provide a novel negative-electrode active material comprising nanometer-size silicon being obtainable by calcining a lamellar polysilane, and to provide an electric storage apparatus with a high capacity maintained rate, the electric storage apparatus made by using the negative-electrode active material for one of the negative electrodes.

Solution to Problem

Features of a negative-electrode active material according to the present invention solving the aforementioned technical problems lie in that the present negative-electrode active material comprises a nanometer-size silicon material produced by heat treating a lamellar polysilane having a structure in which multiple six-membered rings constituted of a silicon atom are disposed one after another, and expressed by a compositional formula, $(SiH)_n$; and the nanometer-size silicon material including silicon, and a halogen element wherein the halogen element is included in a molar fraction of 11.5 or less to a molar amount of the silicon taken as 100 (or in an amount of 11.5 parts by mole or less when an amount of the silicon is taken as 100 parts by mole).

Moreover, the present negative-electrode active material preferably further comprises calcium included in the nanometer-size silicon material in a molar fraction of 1.5 or less to a molar amount of the silicon taken as 100 (or in an amount of 1.5 parts by mole or less when an amount of the silicon is taken as 100 parts by mole).

A preferable lamellar polysilane exhibits Raman-shift peaks existing at $341\pm10$ cm$^{-1}$, $360\pm10$ cm$^{-1}$, $498\pm10$ cm$^{-1}$, $638\pm10$ cm$^{-1}$, and $734\pm10$ cm$^{-1}$ in a Raman spectrum.

Moreover, nanometer-size silicon of the nanometer-size silicon material preferably comprises crystallites having a crystal grain size of from 1 nm to 100 nm, the crystal grain size computed by the Scherrer equation from a half-value width of a diffraction peak in the (111) plane according to a result of an X-ray diffraction measurement.

Moreover, the present negative-electrode active material preferably further comprises oxygen included in the nanometer-size silicon material in an amount of 30% by mass or less.

And, a feature of an electric storage apparatus according to the present invention lies in comprising a negative electrode including the present negative-electrode active material.

Advantageous Effects of the Invention

In accordance with a negative-electrode active material according to the present invention, the halogen-element amount is reduced. Consequently, an electric storage apparatus comprising the present negative-electrode active material expresses a high charged capacity even after a cycle test, so that the capacity maintained rate upgrades markedly. And, keeping an amount of oxygen included in the present negative-electrode active material as less as 30% by mass or less enables the degradations of initial characteristics to be inhibited when the present negative-electrode active material makes up an electric storage apparatus.

DESCRIPTION OF THE EMBODIMENTS

Figure 1:
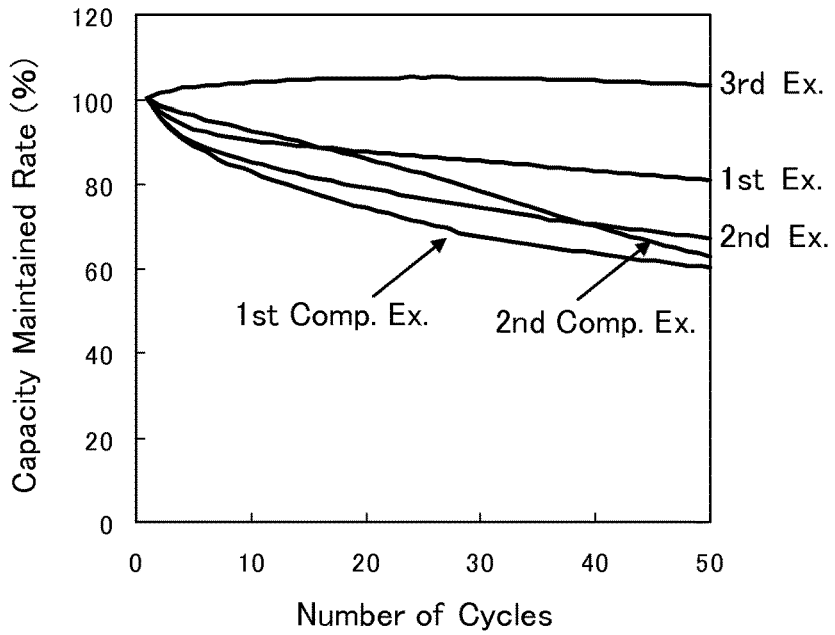
FIG. 1 shows relationships between the number of cycles and the capacity maintained rates of lithium-ion secondary batteries directed to first through third examples and first and second comparative examples.

The inventors named in the present application carried out wholehearted studies regarding the lamellar polysilanes set forth in Non-patent Literature No. 1 and Patent Application Publication No. 3. Reacting calcium disilicide ($CaSi_2$) with an acid, for example, with a hydrogen chloride (HCl) aqueous solution, makes a lamellar polysilane obtainable. The calcium disilicide ($CaSi_2$) makes a lamellar crystal in which Ca atom layers are inserted into between diamond-type Si (111) planes, so that a lamellar polysilane is obtainable by pulling out calcium (Ca) by a reaction with the acid.

Moreover, a mixture of a hydrogen fluoride (HF) aqueous solution and a hydrogen chloride (HCl) aqueous solution is usable as the acid. Regarding a compositional ratio between the hydrogen fluoride (HF) and the hydrogen chloride (HCl), a preferable molar fraction of the hydrogen fluoride (HF) is 100 or less to a molar amount of the hydrogen chloride (HCl) taken as 100. A molar fraction of the hydrogen fluoride (HF) being greater than the ratio is not preferable, because impurities, such as $CaF_2$-and CaSiO-based impurities, generate, and because separating the impurities and a lamellar polysilane from one another is difficult.

Regarding a reacting ratio between the acid and the calcium disilicide ($CaSi_2$), the acid is preferably set to be more excessive than the equivalent to the latter. Moreover, the reaction is preferably carried out under such a desirable reaction atmosphere as under an inert-gas atmosphere. Although a time for the reaction and a temperature therefor are not at all limited especially, the reaction temperature is usually from 0° C. to 100° C., and the reaction time is usually from 0.25 to 24 hours.

In the thus produced lamellar polysilane, impurities, such as chlorine (Cl), fluorine (F) and calcium (Ca), are included. Although in what state the impurities are included has not been clear yet, such a fact became apparent that, even after the obtained lamellar polysilane is washed, the lamellar polysilane contains the impurities in a certain amount, respectively. Nanometer-size silicon, which is obtainable by calcining the lamellar polysilane under a nonoxidizing atmosphere, also contains part of the impurities remaining therein. And, the studies by the present inventors revealed that, in an electric storage apparatus using the obtained nanometer-size silicon as a negative-electrode active material, the capacity maintained rates are declined by the impurities.

Hence, a negative-electrode active material according to the present invention comprises nanometer-size silicon including silicon, and a halogen element wherein the halogen element is included in a molar fraction of 11.5 or less to a molar amount of the silicon taken as 100 (or in an amount of 11.5 parts by mole or less when an amount of the silicon is taken as 100 parts by mole). An electric storage apparatus expressing high capacity maintained rates is obtainable by thus reducing an amount of the impurities. An especially preferable molar fraction of the included halogen element makes 10.0 or less to a molar amount of the silicon taken as 100.

To reduce an amount of the impurities, the impurities are also allowably reduced while the impurities make up a state of the lamellar polysilane, or are even permissibly reduced while the impurities make up a state of the nanometer-size silicon. Moreover, as for a concrete method for reducing an amount of the impurities, ion-exchange methods, or neutralization methods, and the like, are exemplified. When adopting a neutralization method, the neutralization is desirably done while the impurities make up a state of the lamellar polysilane. When the impurities make up a state of the nanometer-size silicon, such a case arises probably as reducing the impurities becomes difficult, because respective nanometer-size silicon particles agglomerate one another so that the impurities have been taken in inside the resultant nanometer-size silicon agglomerates.

When adopting a neutralization method, a weak base, like ammonia and a carbonate or bicarbonate of alkali metal, and so forth, is used preferably to neutralize a reaction liquid including a lamellar polysilane, because using a strong base, like sodium hydroxide, and so on, probably leads to such a possibility that the strong base reacts with the lamellar polysilane. Washing the lamellar polysilane with water after the neutralization results in removing salts of the impurities, and thereby a high-purity lamellar polysilane is obtainable. Calcium (Ca) is also readily removable at the time of the washing with water.

A step of removing the impurities is preferably carried out so as to make a pH of a post-neutralization filtrate fall in a range of from 0.5 to 8.0, and a more preferable range of the pH is from 0.5 to 7.0. When the pH of the filtrate is less than 0.5, a molar fraction of the included halogen element becomes greater than 11.5 to a molar amount of the silicon taken as 100, and thereby capacity maintained rates decline in a case where the lamellar polysilane makes up an electric storage apparatus. Moreover, when the pH of the filtrate exceeds 8.0, an amount of oxygen within the lamellar polysilane becomes so great that such a case arises probably as the initial efficiency of an electric storage apparatus declines.

In a Raman spectrum of the lamellar polysilane, a peak of the Si—Si bond is observed at around 340 $cm^{-1}$, and is shifted to the low-frequency side, compared with single-crystal silicon of which the peak is observed instrumentally at 520 $cm^{-1}$. In general, a bond has been known to become strong when the peak shifts toward the high-frequency side in a Raman spectrum, and has been known to be likely to cut off when the peak shifts toward the low-frequency side therein. That is, having a lamellar polysilane structure leads to weakening the Si—Si bonds, and thereby turning the lamellar polysilane into nanometer-size silicon under a mild condition is believed to become feasible.

A nanometer-size silicon material with a reduced amount of halogen is obtainable by heat treating the lamellar polysilane, which has been obtained via the steps of removing the impurities, at a temperature of 100° C. or more under a nonoxidizing atmosphere. As for the nonoxidizing atmosphere, an inert-gas atmosphere, or a vacuum atmosphere is exemplified. The inert gas is not at all prescribed especially as far as the inert gas is nitrogen ($N_2$), argon (Ar) or helium (He), and the like, which does not include any oxygen ($O_2$).

Moreover, a preferable heat-treatment temperature falls in a range of from 100° C. to 1,000° C., and an especially preferable heat-treatment temperature falls in a range of from 400° C. to 600° C. No nanometer-size silicon generates at less than 100° C. In particular, a lithium-ion secondary battery, in which a nanometer-size silicon material formed by being heat treated at 400° C. or more serves as a negative-electrode active material, exhibits an upgraded initial efficiency.

Nanometer-Size Silicon

A preferable Si crystallite of the nanometer-size silicon has a size of from 1 nm to 100 nm when using the nanometer-size silicon as an electrode active material of the present electric storage apparatus, and an especially preferable size of the Si crystallite falls in a range of from 1 nm to 10 nm. Moreover, a preferable amount of oxygen included in the nanometer-size silicon is 30% by mass or less, and an especially preferable amount thereof is 20% by mass or less.

Negative Electrode of Electric Storage Apparatus

The following steps enable the negative electrode of a nonaqueous-system secondary battery, for instance, to be fabricated using a negative-electrode active material comprising the aforementioned nanometer-size silicon: adding a proper amount of an organic solvent to a powder of the negative-electrode active material, a conductive additive like a carbon powder and a binder to mix the components one another to turn the components into a slurry; coating the slurry onto a current collector by such a method as a roll-coating method, a dip-coating method, a doctor-blade method, a spray-coating method or a curtain-coating method; and then drying or curing the binder.

The binder is required to bind the active material, and so on, together in an amount as less as possible. However, a desirable addition amount of the binder is from 0.5% by weight to 50% by weight to a summed amount of the active material, conductive additive and binder. When the binder is less than 0.5% by weight, the formability of an electrode declines; whereas the energy density of an electrode becomes low when the addition amount exceeds 50% by weight.

For the binder, the following are exemplified: polyvinylidene fluoride (e.g., polyvinylidene difluoride (or PVdF)), polytetrafluoroethylene (or PTFE), styrene-butadiene rubber (or SBR), polyimide (or PI), polyamide-imide (or PAI), carboxymethyl cellulose (or CMC), polyvinylchloride (or PVC), methacrylic resins (or PMA), polyacrylonitrile (or PAN), modified polyphenylene oxide (or PPO), polyethylene oxide (or PEO), polyethylene (or PE), polypropylene (or PP), polyacrylic acids (or PAA), and the like.

Using polyvinylidene fluoride as a binder leads to enabling the electric potential of a negative electrode to lower so that upgrading a voltage of the present electric storage apparatus becomes feasible. Moreover, using polyamide-imide (or PAI) or polyacrylic acids (or PAA) as a binder results in upgrading an initial efficiency and discharged capacities thereof.

A "current collector" means a chemically inactive high electron conductor for keeping an electric current flowing to electrodes during discharging or charging operations. Although a configuration, such as a foil or a plate, is adoptable for the current collector, the configuration is not at all limited especially as far as the configuration conforms to objectives. As the current collector, copper foils, and aluminum foils are usable suitably, for instance.

As the negative-electrode active material, the following publicly-known active materials, for instance, are also mixable with the above-mentioned nanometer-size silicon material: graphite, hard carbon, silicon, carbon fibers, tin (Sn), silicon oxide per se, or carbon-composited silicon oxide of which a carbon material accounts for from 1 to 50% by mass, and the like.

The conductive additive is added in order to enhance the electrically-conducting property of an electrode. As the conductive additive, the following are addable independently, or two or more of the following are combinable to add: carbonaceous fine particles, such as carbon black, graphite, acetylene black (or AB) and KETJENBLACK (or KB (registered trademark)); and gas-phase-method carbon fibers (or vapor-grown carbon fibers (or VGCF)). Although an employment amount of the conductive additive is not at all restrictive especially, setting the employment amount is possible at from 20 to 100 parts by mass approximately with respect to 100-part-by-mass active materials, for instance. When an amount of the conductive additive is less than 20 parts by mass, conductive passes with good efficiency are not formable; whereas, when the amount exceeds 100 parts by mass, not only the formability of an electrode worsens but also the energy density thereof becomes low. Note that, when using as an active material the silicon oxide with which a carbon material is composited, reducing an addition amount of the conductive additive, or making the addition amount none is possible.

To the organic solvent, any restrictions are not at all imposed especially, and even a mixture of multiple solvents does not matter at all. An especially preferable solvent is N-methyl-2-pyrrolidone, or a mixed solvent of N-methyl-2-pyrroidone and an ester-based solvent (such as ethyl acetate, n-butyl acetate, butyl cellosolve acetate, or butyl carbitol acetate) or a glyme-based solvent (such as diglyme, triglyme, or tetraglyme).

When the electric storage apparatus according to the present invention makes a lithium-ion secondary battery, one of the negative electrodes is also allowed to be pre-doped with lithium. To dope the negative electrode with lithium, such an electrode chemically-forming technique is utilizable as assembling a half cell using metallic lithium for one of the counter electrodes and then doping the negative electrode with lithium electrochemically. The doping amount of lithium is not at all restricted especially.

When the electric storage apparatus according to the present invention makes a lithium-ion secondary battery, publicly-known positive electrodes, electrolytic solutions and separators are usable without any special limitations at all. An allowable positive electrode is positive electrodes being employable in nonaqueous-system secondary batteries. The positive electrode comprises a current collector, and a positive-electrode active-material layer bound together onto the current collector. The positive-electrode active-material layer includes a positive-electrode active material, and a binder, but the positive-electrode active-material layer further including a conductive additive is also permissible. The positive-electrode active material, conductive additive and binder are not at all limited especially, and accordingly are allowed to be constituent elements being employable in nonaqueous-system secondary batteries.

As for the positive-electrode active material, the following are given: metallic lithium, $LiCoO_2$, $LiNi_{1/3}Co_{1/3}Mn_{1/3}O_2$, $Li_2MnO_3$, sulfur, and the like. An allowable current collector is current collectors, such as aluminum, nickel and stainless steels, to be commonly employed for the positive electrodes of lithium-ion secondary batteries. An employable conductive additive is the same as the conductive additives set forth in the negative electrode mentioned above.

The electrolytic solution is a solution in which a lithium metallic salt, namely, an electrolyte, has been dissolved in an organic solvent. The electrolytic solution is not at all limited especially. As the organic solvent, an aprotic organic solvent is usable. For example, one or more members selected from the group consisting of the following are usable: propylene carbonate (or PC), ethylene carbonate (or EC), dimethyl carbonate (or DMC), diethyl carbonate (or DEC), ethyl methyl carbonate (or EMC), and the like. Moreover, as for the electrolyte to be dissolved, a lithium metallic salt, such as $LiPF_6$, $LiBF_4$, $LiAsF_6$, LiI, $LiClO_4$ or $LiCF_3SO_3$, being soluble in the organic solvent is usable.

For example, the following solution is employable: a solution comprising a lithium metallic salt, such as $LiClO_4$, $LiPF_6$, $LiBF_4$ or $LiCF_3SO_3$, dissolved in a concentration of from 0.5 mol/L to 1.7 mol/L approximately in an organic solvent, such as ethylene carbonate, dimethyl carbonate, propylene carbonate or diethyl carbonate.

The separator is not at all limited especially as far as being separators being employable for nonaqueous-system secondary batteries. The separator is one of the constituent elements isolating the positive electrode and negative electrode from one another and retaining the electrolytic solution therein, and accordingly a thin microporous membrane, such as polypropylene or polyethylene, is usable.

When the electric storage apparatus according to the present invention makes a nonaqueous-system secondary battery, the configuration is not at all limited especially, and accordingly various configurations, such as cylindrical types, laminated types and coin types, are adoptable. Even when any one of the configurations is adopted, the separators are interposed or held between the positive electrodes and the negative electrodes to make electrode assemblies. Then, after connecting intervals from the positive-electrode current collectors and negative-electrode current collectors up to the positive-electrode terminals and negative-electrode terminals, which lead to the outside, with leads for collecting electricity, and the like, the electrode assemblies are sealed hermetically in a battery case along with the electrolytic solution, thereby turning the positive-electrode and negative-electrode assemblies into a battery.

The embodiment modes of the present invention are hereinafter explained in detail by describing examples and comparative examples thereof.

FIRST EXAMPLE

Reaction Step 20-mL HCl aqueous solution with a concentration of 36% by weight was cooled to 0° C. in an ice bath, and 2-g calcium disilicide ($CaSi_2$) was added to the aqueous solution and was then stirred therein within a flow of argon gas. After confirming that bubbling had completed, the temperature was increased up to room temperature, and then the mixture was further stirred at room temperature for 17 hours. On the occasion, a yellow-colored powder floated.

Impurity Removal Step

A sodium bicarbonate aqueous solution with a concentration of 10% by mass was added to an obtained reaction liquid until a pH of a post-neutralization filtrate became 1.5. The obtained solution was filtered. After washing a residue with 10-mL distilled water three times, the residue was further washed with 10-mL ethanol. Then, the residue was vacuum dried to obtain 2-g lamellar polysilane. Upon measuring a Raman spectrum of the lamellar polysilane, peaks existed at 341 $cm^{-1}$, 360 $cm^{-1}$, 498 $cm^{-1}$, 638 $cm^{-1}$, and 734±10 $cm^{-1}$, respectively.

Calcination Step

The lamellar polysilane powder was weighed out in an amount of 1 g, and underwent a heat treatment in which the weighed-out lamellar polysilane was retained at 500° C. for 1 hour within an argon gas including $O_2$ in an amount of 1% by volume or less, thereby obtaining a nanometer-size silicon powder. An X-ray diffraction measurement (or XRD measurement) using the $CuK_\alpha$ ray was carried out to the nanometer-size silicon powder. According to the XRD measurement, a halo believed to be derived from Si fine particles was observed instrumentally. The Si fine particles had a crystal grain size of about 7 nm computed by the Scherrer equation from a half-value width of a diffraction peak in the (111) plane according to a result of the X-ray diffraction measurement.

Lithium-Ion Secondary Battery

A slurry was prepared by mixing the following one another: the obtained nanometer-size silicon powder in an amount of 45 parts by mass; a powder of natural graphite in an amount of 40 parts by mass; acetylene black in an amount of 5 parts by mass; and a binder solution in an amount of 33 parts by mass. For the binder solution, a solution comprising a polyamide-imide (or PAI) resin dissolved in N-methyl-2-pyrrolidone (or NMP) in an amount of 30% by mass was used. The slurry was coated onto a surface of an electrolyzed copper foil (i.e., a current collector) having about 20 µm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 200° C. for 2 hours, thereby forming a negative electrode of which the negative-electrode active-material layer had a thickness of 16 µm.

Using as an evaluation electrode the negative electrode fabricated through the procedures mentioned above, a lithium-ion secondary battery (i.e., a half cell) was fabricated. A metallic lithium foil with 500 µm in thickness was set as the counter electrode.

The counter electrode was cut out to ϕ12 mm, and the evaluation electrode was cut out to ϕ11 mm. Then, a separator composed of a glass filter produced by HOECHST CELANESE Corporation and "Celgard 2400" produced by CELGARD Corporation was set or held between the two to make an electrode-assembly battery. The electrode-assembly battery was accommodated in a battery case (e.g., a member for CR2032-type coin battery, a product of HOSEN Co., Ltd.). A nonaqueous electrolytic solution was injected into the battery case. Note that the nonaqueous electrolytic solution comprised a mixed solvent composed of ethylene carbonate and diethyl carbonate mixed one another in a ratio of 1:1 by volume, and $LiPF_6$ dissolved in the mixed solvent in a concentration of 1 M. Then, the battery case was sealed hermetically to obtain a lithium-ion secondary battery.

SECOND EXAMPLE

Except that, in the impurity removal step, after filtering the obtained reaction liquid and then washing the residue with the 10-mL distilled water, another 10-mL distilled water was added to the residue and then a sodium bicarbonate aqueous solution with a concentration of 10% by mass was further added to the mixture of the residue and water until a pH of a post-neutralization filtrate became 5.0, a lamellar-polysilane powder was prepared in the same manner as the first example. Other than using the lamellar polysilane, a nanometer-size silicon powder was prepared in the same manner as the first example. Moreover, other than using the nanometer-size silicon powder, a lithium-ion secondary battery was fabricated in the same manner as the first example.

THIRD EXAMPLE

Except that, in the impurity removal step, the sodium bicarbonate aqueous solution was added to the obtained reaction liquid until a pH of the post-neutralization filtrate became 7.6, a lamellar-polysilane powder was prepared in the same manner as the first example. Other than using the lamellar polysilane, a nanometer-size silicon powder was prepared in the same manner as the first example. Moreover, other than using the nanometer-size silicon powder, a lithium-ion secondary battery was fabricated in the same manner as the first example.

FIRST COMPARATIVE EXAMPLE

Except that the impurity removal step was not carried out at all, a lamellar -polysilane powder was prepared in the same manner as the first example. Other than using the lamellar polysilane, a nanometer-size silicon powder was prepared in the same manner as the first example. Moreover, other than using the nanometer-size silicon powder, a lithium-ion secondary battery was fabricated in the same manner as the first example.

SECOND COMPARATIVE EXAMPLE

A mixed solution of 7-mL HF aqueous solution with a concentration of 46% by mass and 56-mL HCl aqueous solution with a concentration of 36% by weight was cooled to 0° C. in an ice bath. Then, 3.3-g calcium disilicide ($CaSi_2$) was added to the mixed solution, and was stirred therein within a flow of argon gas. After confirming that bubbling had completed, the temperature was increased up to room temperature, and then the mixture was further stirred at room temperature for two hours. On the occasion, a yellow-colored powder floated.

The obtained mixed solution was filtered, and a residue was then washed with 10-mL distilled water. Thereafter, the residue was further washed with 10-mL ethanol, and was vacuum dried to obtain 2.5-g lamellar polysilane.

The lamellar polysilane was weighed out in an amount of 1 g, and underwent a heat treatment in which the weighed-out lamellar polysilane was retained at 500° C. for 1 hour within an argon gas including $O_2$ in an amount of 1% by volume or less, thereby obtaining a nanometer-size silicon powder. Other than using the nanometer-size silicon powder, a lithium-ion secondary battery was fabricated in the same manner as the first example.

Composition Analysis

Using an oxygen/nitrogen/hydrogen analyzing apparatus (e.g., "EMGA" produced by HORIBA Corporation), the nanometer-size silicon powders according to the first through third examples and the first and second comparative examples were analyzed for the oxygen (O) amounts, respectively. Moreover, the chlorine (Cl), calcium (Ca) and silicon (Si) amounts were analyzed by a fluorescent X-ray analysis (or XRF), respectively. Thus, composition ratios of each of the elements were computed, respectively. Table 1 shows the results.

TABLE 1

|  | Acid Species | pH of Post-neutralization Filtrate | Molar Ratio (to Si) | | | | Oxygen Amount (% by mass) |
| --- | --- | --- | --- | --- | --- | --- | --- |
|  |  |  | F | Cl | Ca | Si |  |
| 1st Ex. | HCl | 1.5 | 0.0 | 9.9 | 0.4 | 100.0 | 19.3 |
| 2nd Ex. | HCl | 5.0 | 0.0 | 6.7 | 0.2 | 100.0 | 24.6 |
| 3rd Ex. | HCl | 7.6 | 0.0 | 8.7 | 0.7 | 100.0 | 35.5 |

TABLE 1-continued

|  | Acid Species | pH of Post-neutralization Filtrate | Molar Ratio (to Si) | | | | Oxygen Amount (% by mass) |
| --- | --- | --- | --- | --- | --- | --- | --- |
|  |  |  | F | Cl | Ca | Si |  |
| 1st Comp. Ex. | HCl | 0.0 | 0.0 | 14.5 | 1.9 | 100.0 | 15.9 |
| 2nd Comp. Ex. | HF & HCl | 0.0 | 4.9 | 7.4 | 1.8 | 100.0 | 22.2 |

The nanometer-size silicon powders according to the respective examples to which the impurity removal step had been carried out were found out to have reduced molar ratios of the halogen elements (e.g., F and Cl) and calcium (Ca) to the silicon (Si), compared with the first comparative example. Moreover, as the pH of the post-neutralization filtrate became high, reducing degrees of the molar ratios of the halogen elements also become large apparently. However, as the pH of the post-neutralization filtrate became high, mass percentages of the oxygen (O) were even found out to become high as well.

Battery Characteristics

The lithium-ion secondary batteries according to the first through third examples and the first and second comparative examples were measured for initial charged capacities (or initial capacities) upon being charged under such conditions that the temperature was set at 25° C. and the electric current was set at 0.2 mA. Table 2 shows the results. Moreover, the lithium-ion secondary batteries were measured for discharged capacities upon being discharged under such a condition that the electric current was set at 0.2 mA, and then initial efficiencies (i.e., (Charged Capacities)/(Discharged Capacities)) were computed, respectively. Table 2 shows the results as well.

Figure 2:
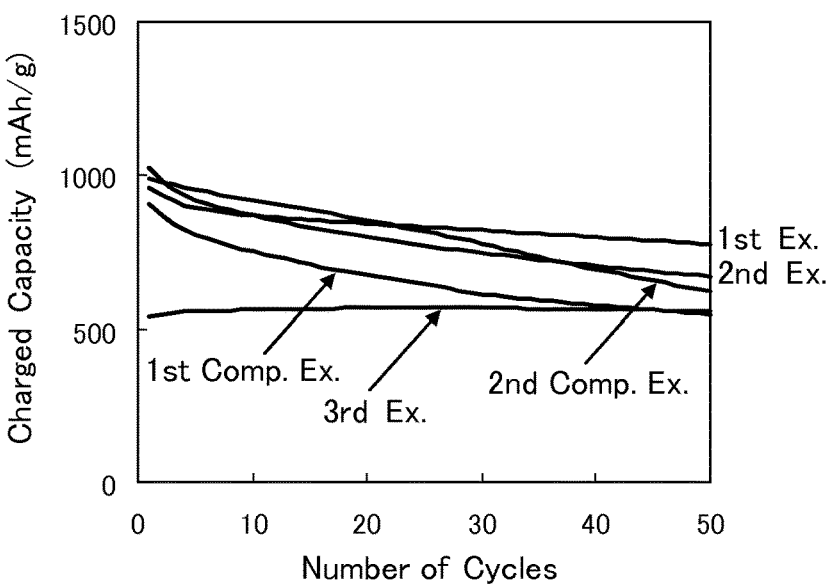
FIG. 2 shows relationships between the number of cycles and the charged capacities of the lithium-ion secondary batteries directed to the first through third examples and the first and second comparative examples.

Next, using the lithium-ion secondary batteries according to the first through third examples and the first and second comparative examples, a cycle test was carried out. In the cycle test, a cycle composed of steps described below was repeated 50 cycles: the batteries were charged up to 1 V under such conditions that the temperature was set at 25° C. and the electric current was set at 0.2 mA; the batteries took a pause for 10 minutes; the batteries were then discharged down to 0.01 V under such a condition that the electric current was set at 0.2 mA; and the batteries took another pause for another 10 minutes. And, capacity maintained rates, namely, proportions of the "N"th-cycle charged capacities to the 1st-cycle charged capacities, were measured. FIG. 1 illustrates the results. Moreover, FIG. 2 illustrates changes of the charged capacities. In addition, Table 2 shows the post-50th-cycle capacity maintained rates.

TABLE 2

|  | Acid Species | pH of Post-neutralization Filtrate | Capacity Maintained Rate (%) | Initial Capacity (mAh/g) | Initial Efficiency (%) |
| --- | --- | --- | --- | --- | --- |
| 1st Ex. | HCl | 1.5 | 80.8 | 961 | 68.6 |
| 2nd Ex. | HCl | 5.0 | 67.2 | 1024 | 66.5 |
| 3rd Ex. | HCl | 7.6 | 103.2 | 540 | 53.0 |
| 1st Comp. Ex. | HCl | 0.0 | 60.2 | 908 | 73.9 |
| 2nd Comp. Ex. | HF & HCl | 0.0 | 62.8 | 993 | 73.8 |

From FIG. 1 and Table 2, using the nanometer-size silicon accompanied by the filtrate of which the pH was close to 8.0 was found out to inhibit the post-cycle-test capacity from declining, and accordingly reducing the halogen element apparently led to greatly upgrading the cyclability. However, from FIG. 2 and Table 2, the following were understandable: as the pH of the filtrates approached 8.0, not only the charged capacities declined after the cycles, but also the initial capacities and initial efficiencies declined. Since the declines correlated with the mass percentages of the oxygen (O), the declines resulted from the augmented oxygen amounts. In particular, since the initial capacity and initial efficiency were remarkably low in the third example, keeping the pH of the filtrates 7.0 or less is said to be preferable when neutralizing the lamellar polysilanes.

INDUSTRIAL APPLICABILITY

The electric storage apparatus according to the present invention is utilizable for secondary batteries, electric double-layer capacitors, lithium-ion capacitors, and the like. Moreover, the present electric storage apparatus is useful for nonaqueous-system secondary batteries utilized for driving the motors of electric automobiles and hybrid automobiles, and for personal computers, portable communication gadgets, home electric appliances, office devices, industrial instruments, and so forth. In particular, the present electric storage apparatus is usable suitably for driving the motors of electric automobiles and hybrid automobiles requiring large capacities and large outputs.

The invention claimed is:

1. A production process for negative-electrode active material, the production process comprising the steps of:

a reaction step of obtaining a lamellar polysilane by reacting a hydrogen chloride (HCl) aqueous solution with calcium disilicide;

an impurity removal step of turning the lamellar polysilane into an impurity-reduced lamellar polysilane by removing halogen elements from the lamellar polysilane; and a calcination step of obtaining a nanometer-size silicon powder by heat treating the impurity-reduced lamellar polysilane at a temperature exceeding 100° C. under a nonoxidizing atmosphere, wherein said impurity removal step is carried out by neutralizing a reaction solution including said lamellar polysilane with a base after said reaction step.

2. The production process for negative-electrode active material as set forth in claim 1, wherein said reaction step is carried out by reacting a mixture of a hydrogen chloride (HCl) aqueous solution and a hydrogen fluoride (HF) aqueous solution with calcium disilicide.

3. The production process for negative-electrode active material as set forth in claim 1, wherein said impurity removal step is carried out so as to make a pH of a post-neutralization filtrate from 0.5 to 8.0.

4. The production process for negative-electrode active material as set forth in claim 1, wherein said impurity removal step is carried out so as to make a pH of a post-neutralization filtrate from 0.5 to 7.0.

5. The production process for negative-electrode active material as set forth in claim 1, wherein said calcination step is a step of heat treating at 400° C. or more.

* * * * *